US011198361B2

(12) United States Patent
Uehata (10) Patent No.: US 11,198,361 B2
(45) Date of Patent: Dec. 14, 2021

(54) HYDROGEN FILLING STRUCTURE (71) Applicant: Toyota Jidosha Kabushiki Kaisha, Toyota (JP)

(72) Inventor: Takanori Uehata, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 176 days.

(21) Appl. No.: 16/718,948

(22) Filed: Dec. 18, 2019

(65) Prior Publication Data
US 2020/0215903 A1 Jul. 9, 2020

(30) Foreign Application Priority Data
Jan. 9, 2019 (JP) .............................. JP2019-001603

(51) Int. Cl.
B60K 15/05 (2006.01)
B60K 15/04 (2006.01)
B60K 15/03 (2006.01)

(52) U.S. Cl.
CPC .... *B60K 15/05* (2013.01); *B60K 2015/03315* (2013.01); *B60K 2015/0458* (2013.01); *B60K 2015/0553* (2013.01)

(58) Field of Classification Search
CPC .......... B60K 15/05; B60K 2015/03315; B60K 2015/0458; B60K 2015/0553
USPC ...................................................... 296/97.22
See application file for complete search history.

(56) References Cited

U.S. PATENT DOCUMENTS

2020/0173215 A1\* 6/2020 Hirama ................. E05F 1/1215

FOREIGN PATENT DOCUMENTS

JP 2015-035889 A 2/2015

\* cited by examiner

*Primary Examiner* — Mahmoud Gimie
(74) *Attorney, Agent, or Firm* — Dinsmore & Shohl LLP (57) ABSTRACT A drainage portion extending from one to the other of a bottom wall of a recess and a lid is provided at least above a hydrogen filling port in the recess when the lid is in a closed state. Therefore, water, which has entered the recess from a gap (parting) when the lid is in a closed state, reaches an upper surface of the drainage portion and flows along the upper surface of the drainage portion, and then, the water flows down from the drainage portion while avoiding the hydrogen filling port. Accordingly, it is possible to suppress the water having entered the recess while the lid is in a closed state from adhering to the hydrogen filling port.

9 Claims, 8 Drawing Sheets

HYDROGEN FILLING STRUCTURE

CROSS-REFERENCE TO RELATED APPLICATIONS

This application claims priority to Japanese Patent Application No. 2019-001603 filed on Jan. 9, 2019, which is incorporated herein by reference in its entirety including the specification, drawings and abstract.

BACKGROUND

1. Technical Field

The present disclosure relates to a structure of a hydrogen filling part of a fuel cell vehicle.

2. Description of Related Art

Japanese Patent Application Publication No. 2015-035889 discloses a structure provided with a hydrogen filling port on a rear lateral surface of a vehicle.

Generally, in a gasoline vehicle, a bellows-like rubber member or the like is installed to a base part of a fueling gun to prevent foreign matters such as Water from entering a fuel tank during fueling. On the other hand, in a fuel cell vehicle, adhesion of water to a part at which the filling gun and the hydrogen filling port of the vehicle are in contact with each other during hydrogen filling causes a problem. Specifically, since hydrogen is stored at a low temperature, the temperature of the hydrogen tilling port becomes low when the fueling gun is inserted into the hydrogen filling port to fill hydrogen. Therefore, there is a possibility that water adhering to the hydrogen filling port becomes frozen, and thus a relatively large force is required for pulling out the filling gun from the hydrogen filling port.

SUMMARY

An object of the present disclosure is to provide a hydrogen filling structure that can suppress water from adhering to a hydrogen filling port.

The present disclosure for achieving the above object is as follows.

(1) First and Second Embodiments

A hydrogen filling structure including: a recess provided to an outer panel of a vehicle body; a hydrogen filling port disposed to protrude from a bottom wall of the recess into the recess; and a lid configured to open and close the recess, wherein in a state in which the lid is closed, a drainage portion is provided at least above the hydrogen filling port in the recess in such a manner as to extend from one to the other of the bottom wall of the recess and the lid.

(2) First and Second Embodiments

The hydrogen filling structure according to (1), wherein: the hydrogen filling port has a gun fitting portion into which a filling gun is fitted; and the drainage portion covers the gun fitting portion at least from above.

(3) First and Second Embodiments

The hydrogen filling structure according to (1) or (2), wherein as viewed from a base side in an extending direction of the drainage portion, an upper surface of the drainage portion is inclined to either or both of right and left sides with respect to the hydrogen filling port at a center position.

(4) First and Second Embodiments

The hydrogen filling structure according to any one of (1) to (3), wherein an upper surface of the drainage portion is formed in an inverted V shape that is convex upward in a sectional view orthogonal to the extending direction of the drainage portion.

(5) First and Second Embodiments

The hydrogen filling structure according to any one of (1) to (4), wherein the drainage portion is provided, at a front end thereof in the extending direction, with a flange that is bent and extends in a direction away from the hydrogen filling port.

(6) First and Second Embodiments

The hydrogen filling structure according to any one of (1) to (5), wherein the drainage portion is provided to extend from the lid in a closed state toward the bottom, wall of the recess.

(7) First and Second Embodiments

The hydrogen filling structure according to (6), wherein: the lid includes a lid inner made of resin, and a lid outer fixed to the lid inner; and the drainage portion is made of resin and integrally formed with the lid inner.

(8) First Embodiment

The hydrogen filling structure according to any one of (1) to (7), wherein the drainage portion is provided only above the hydrogen filling port or only above and on a lateral side of the hydrogen filling port.

(9) Second Embodiment

The hydrogen filling structure according to any one of (1) to (7), wherein the drainage portion is provided at an outer position continuously around a whole outer circumference of the hydrogen filling port.

According to the hydrogen filling structure of the above (1), when the lid is in a closed state, the drainage portion extending from one to the other of the bottom wall of the recess and the lid is provided at least above the hydrogen filling port in the recess. Therefore, when the lid is in a closed state, the water, having entered the recess from the gap (parting) between the lid and the outer panel of the vehicle body reaches the upper surface of the drainage portion, and flows along the upper surface of the drainage portion, and then flows down from the drainage portion while avoiding the hydrogen filling port. Therefore, it is possible to suppress the water having entered the recess when the lid is in a closed state from adhering to the hydrogen filling port. Accordingly, when the lid in a closed state is opened, and the fueling gun of the fuel supply device is fitted into the hydrogen filling port from the outside of the vehicle body to fill hydrogen, it is possible to suppress the water adhering to the hydrogen filling port from being frozen by a low-temperature hydrogen gas being filled, thus preventing the filling gun from not being pulled out.

According to the hydrogen filling structure of the above (2), since the drainage portion covers the gun fitting portion at least from above, it is possible to effectively suppress the water, which has entered the recess from the gap (parting) between the lid, and the outer panel of the vehicle body with the lid in a closed state, from adhering to the gun fitting portion. Therefore, when the lid in a closed state is opened, and the fueling gun of the fuel supply device is fitted into the hydrogen filling port from the outside of the vehicle body to fill hydrogen, it is possible to effectively suppress the water adhering to the hydrogen filling port from being frozen by the low-temperature hydrogen gas being filled, thus preventing the filling gun from not being pulled out.

According to the hydrogen filling structure of the above (3), the upper surface of the drainage portion is inclined to (has an inclined surface on) either or both of the left or the right sides respect to the hydrogen filling port at the center position; thus, when the lid is in a closed state, water having entered the recess from the gap (parting) between the lid and the outer panel of the vehicle body and having reached the upper surface of the drainage portion can be brought to flow along the inclined surface. Accordingly, it is possible to allow the water to efficiently flow down from the drainage portion while avoiding the hydrogen filling port.

According to the hydrogen filling structure of the above (4), since the upper surface of the drainage portion has an inverted V shape that is convex upward in a sectional view orthogonal to the extending direction of the drainage portion, the water, which has entered the recess from the gap (parting) between the lid and the outer panel of the vehicle body when the lid is in a closed state and has reached the top surface of the drainage portion, can be brought to flow along the upper surface of the inverted V-shaped drainage portion to both sides of the drainage portion. Therefore, it is possible to allow the water to efficiently flow down from the drainage portion while avoiding the hydrogen filling port.

According to the hydrogen filling structure of the above (5), since the drainage portion is provided, at its front end in the extending direction, with a flange that is bent, and extends in the direction away from the hydrogen filling port, it is possible to suppress the water flowing along the upper surface of the drainage portion from flowing down from the front end in the extending direction of the drainage portion toward the hydrogen filling port.

According to the hydrogen filling structure of the above (6), since the drainage portion is provided to the lid, the drainage portion can be moved together with the lid when the lid is opened. Therefore, it is possible to prevent the drainage portion from staying around the hydrogen filling port when the lid is in the open state. Accordingly, when the lid is opened and the filling gun of the fuel supply device is fitted into the hydrogen filling port to fill hydrogen from the outside of the vehicle body, it is possible to suppress that the drainage portion interferes with the filling gun and hinders the hydrogen filling work.

According to the hydrogen filling structure of the above (7), since the drainage portion is made of resin and formed integrally with the lid inner, compared to the case in which the drainage portion is formed separately from the lid inner and is fixedly attached to the lid inner, the number of parts and assembly man-hours can be reduced, thus reducing the cost.

According to the hydrogen filling structure of the above (8), since the drainage portion is provided only above the hydrogen filling port or only above and on the lateral side of the hydrogen filling port, compared with the case in which the drainage portion is provided at an outer position continuously around the whole outer circumference of the hydrogen filling port, the weight can be reduced, which is advantageous in cost.

According to the hydrogen filling structure of the above (9), the drainage portion is provided at an outer position continuously around the whole outer circumference of the hydrogen filling port; accordingly, it is possible to reliably suppress the water flowing along the upper surface of the drainage portion from adhering to the hydrogen filling port.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 5:
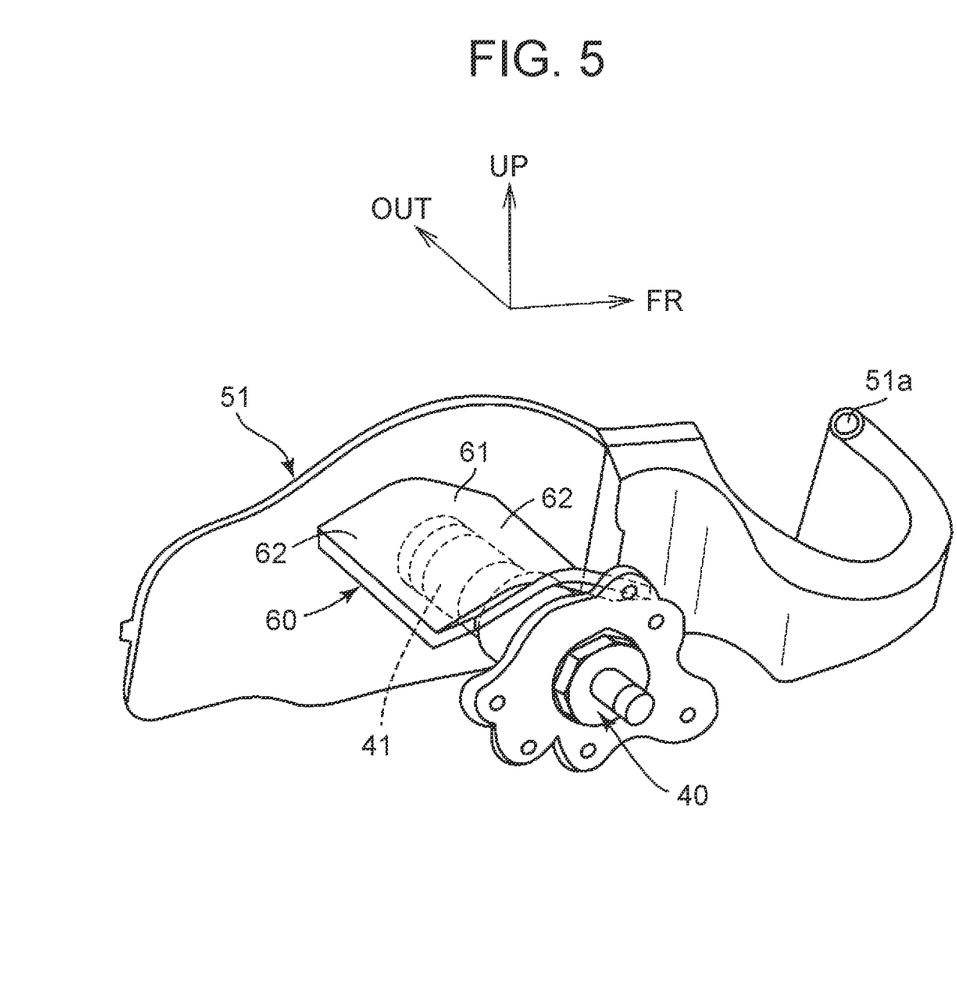
FIG. 5 is a perspective view of the hydrogen filling port, the lid inner, and the drainage portion of the hydrogen filling structure of the first embodiment of the present disclosure.
Figure 6:
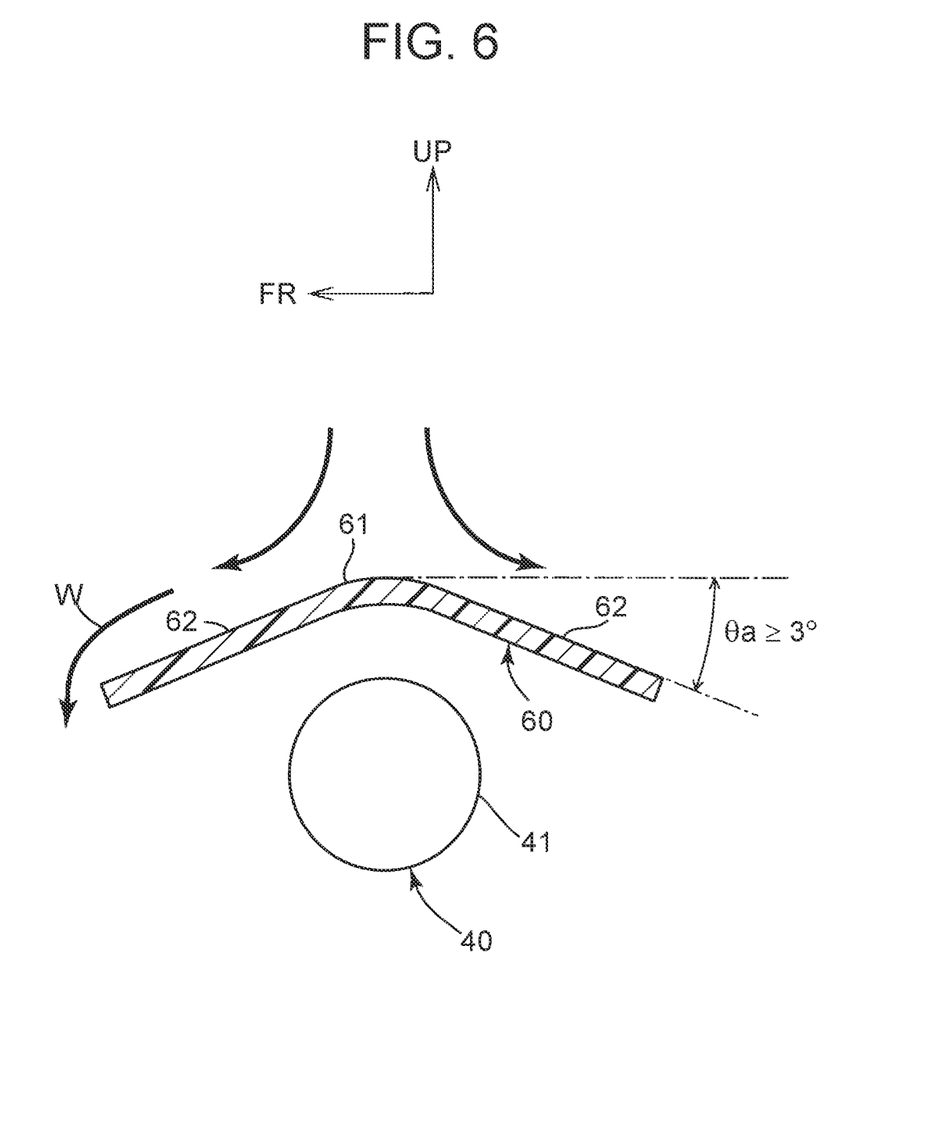
FIG. 6 is a sectional view taken along line B-B FIG. 4.
Figure 7:
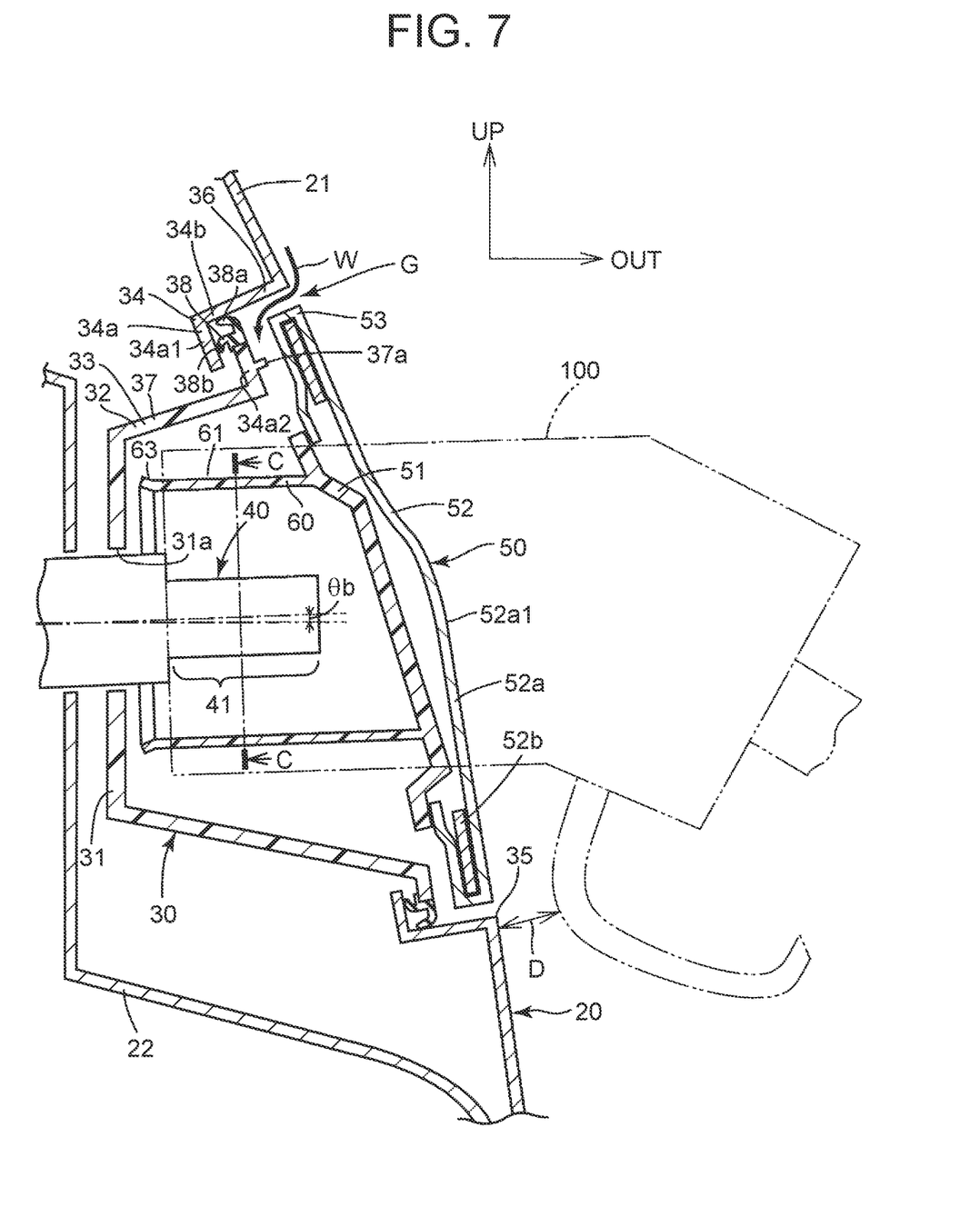
FIG. 7 is a sectional view of a hydrogen filling structure of a second embodiment of the present disclosure.
Figure 8:
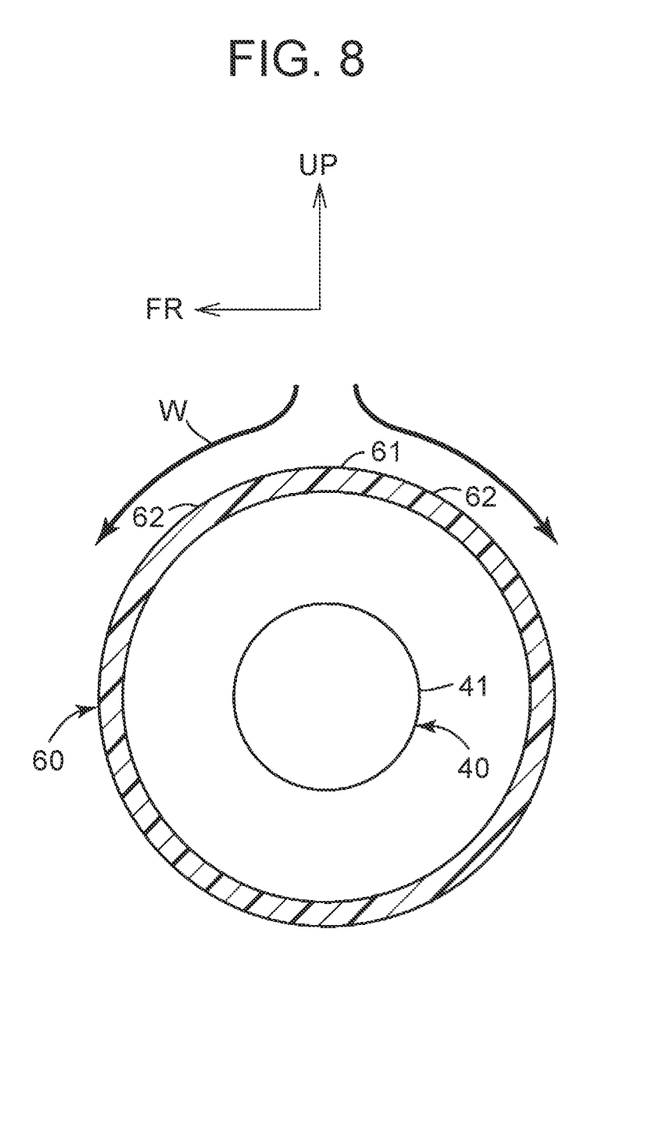
FIG. 8 is a sectional view taken along line C-C of FIG. 7.

FIG. 1 to FIG. 6 show a hydrogen filling structure of the first embodiment of the present disclosure, and FIG. 7, FIG. 8 show a hydrogen filling structure of the second embodiment of the present disclosure. In the drawings, FR indicates the front side (frontward direction of a vehicle body), UP indicates the upper side (upward direction of the vehicle body), and OUT indicates the outer side in the vehicle width direction. Common parts and components through the embodiments of the present disclosure are denoted by the same reference numerals through the embodiments of the present disclosure.

Figure 3:
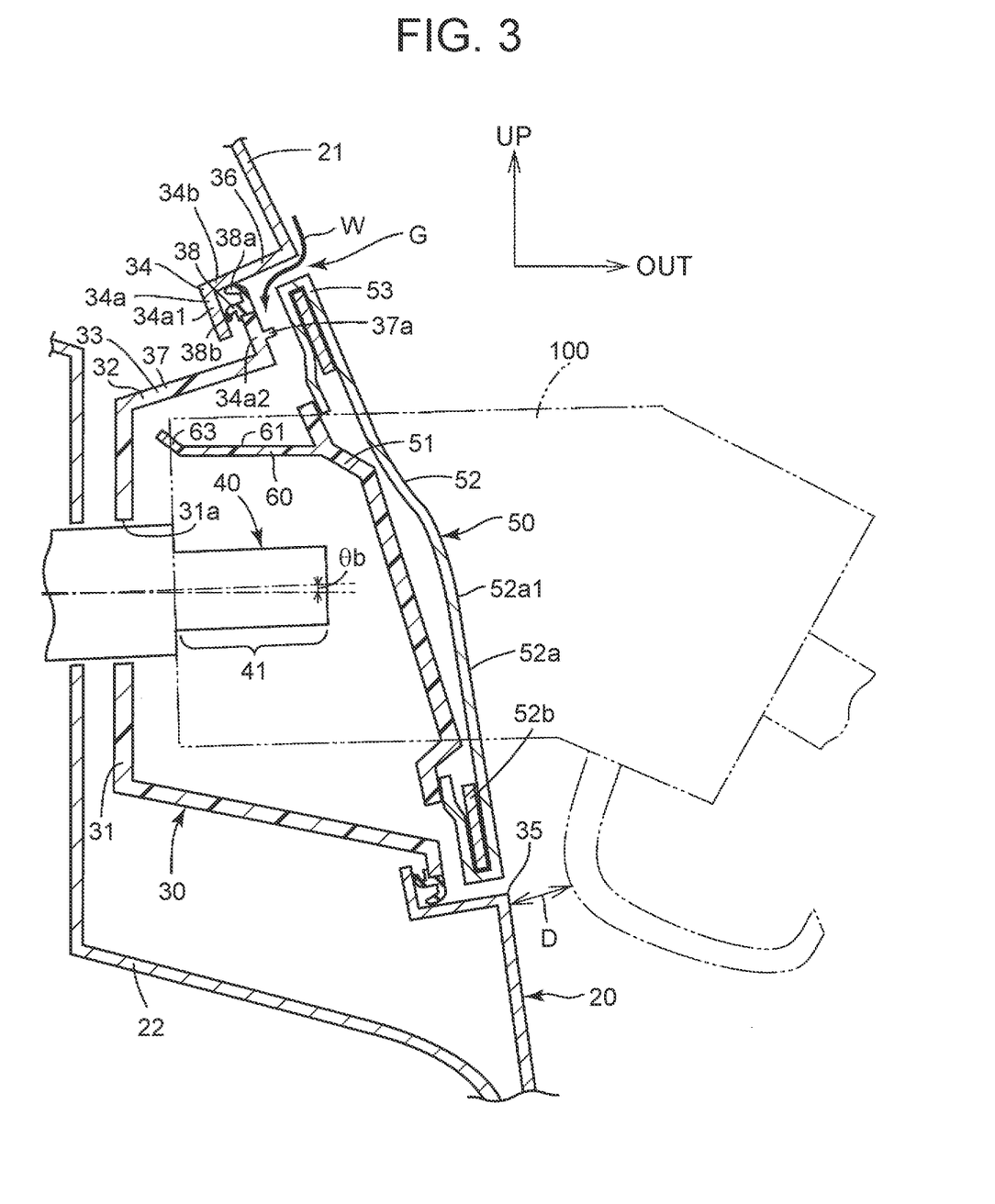
FIG. 3 is a sectional view taken along line A-A of FIG. 1.
Figure 4:
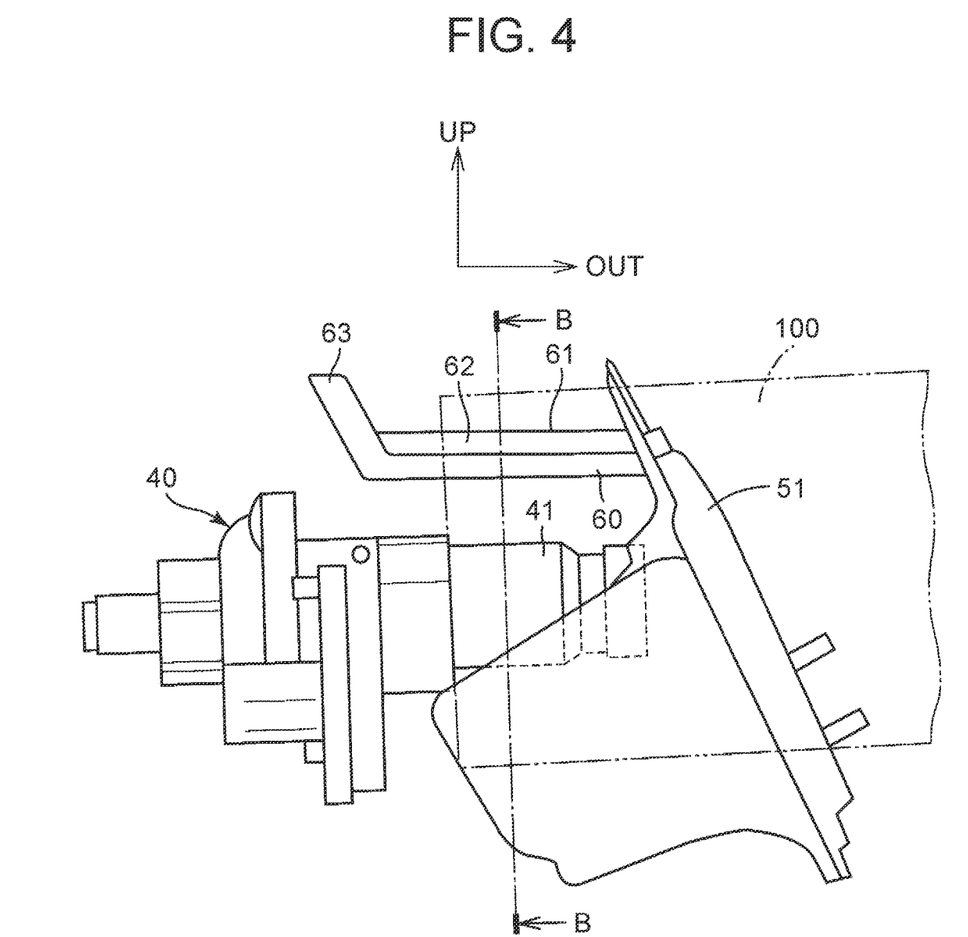
FIG. 4 is a side view of a hydrogen filling port, a lid inner, and a drainage portion of the hydrogen filling structure of the first embodiment of the present disclosure.

First, description will be provided on common parts and components through each embodiment of the present disclosure. As shown in FIG. 3, the hydrogen filling structure 10 of the embodiments of the present disclosure includes: a recess 30 provided to a vehicle body 20; a hydrogen filling port 40; a lid 50; and a drainage portion 60.

The recess 30 is provided to be recessed inward in the vehicle width direction on a lateral surface of an outer panel (which may also be referred to as an outer surface panel or a side member outer) 21 of the vehicle body 20. The recess 30 includes: a bottom wall (which may also be referred to as a back wall) 31; and a side wall 32 extending outward in the vehicle width direction from the bottom wall 31.

The bottom wall 31 is provided with a filling-port insertion hole 31a which penetrates the bottom wall 31 in the vehicle width direction, and into which the hydrogen filling port 40 is inserted. The side wall 32 includes: a side-wall general portion 33 that extends outward in the vehicle width direction from the bottom wall 31; and a step portion 34 that is continued to an outer end in the vehicle width direction of the side-wall general portion 33.

The step portion 34 is provided at an outer end in the vehicle width direction of the recess 30, that is, at an end of the recess 30 on the opening 35 side. The step portion 34 is formed to increase the inner volume of the recess 30 and accept an outer circumferential end 53 of the lid 50 in a closed state therein. The step portion 34 includes: a step bottom wall 34a extending in a direction of increasing the inner volume of the recess 30 from the outer end in vehicle width direction of the side-wall general portion 33; and a stopped side wall 34b extending outward in the vehicle width direction from the front end in the extending direction of the step bottom wall 34a to the opening 35 of the recess 30.

The recess 30 has a multi-component configuration and includes a panel member 36 and a box-like member 37 that are formed as separate members. The box-like member 37 may have a single-component configuration or a multi-component configuration. The recess 30 is formed by fixing the panel member 36 and the box-like member 37 to each other.

The panel member 36 is made of metal, for example, and is fixed to the outer panel 21 of the vehicle body 20. The panel, member 36 may be formed by a part of the outer panel 21, or may be formed separately from the outer panel 21 and fixedly attached to the outer panel 21. The panel member 36 is formed with a stepped side wall 34b and a portion 34a1 of the step bottom wall 34a.

The box-like member 37 is made of resin, for example, and is fixed to the panel member 36. The box-like member 37 is formed with, a remaining portion 34a2 excluding the portion 34a1 of the step bottom wall 34a, the side-wall general portion 33, and the bottom wall 31. The step bottom wall 34a is formed by the portion 34a1 of the step bottom wall 34a of the panel member 36 and the remaining portion 34a2 of the step bottom wall 34a of the box-like member 37.

An elastic member (seal member) 38 such as rubber is provided to the remaining portion 34a2 of the step bottom wall 34a of the box-like member 37. The elastic member 38 may be integrally formed with the box-like member 37 by double-color molding, for example. The elastic member 38 is provided at art outer position continuously around the whole circumference of the step bottom wall 34a. The elastic member 38 includes; a side wall lip 38a that projects toward the panel member 36 forming the stepped side wall 34b and is in contact with the panel member 36; and a bottom wall lip 38b that projects toward the portion 34a1 of the step bottom wall 34a and is in contact with the portion 34a1. The side wall lip 38a and the bottom wall lip 38b serve for suppressing water W, which has entered the recess 30 from a parting (gap) G between the outer panel 21 of the vehicle body 20 and the lid 50 in a closed state, from entering the inside of the vehicle body 20 from between the panel member 36 and the box-like member 37. In light of suppressing the water W from entering the inside of the vehicle body 20, it is desirable that both the side wall lip 38a and the bottom wall lip 38b are provided, and only either one of them may also be provided.

In addition, the remaining portion 34a2 of the step bottom wall 34a of the box-like member 37 is provided with a rib 37a projecting toward the lid 50 in a closed state. The rib 37a may be provided at an outer position continuously around the whole circumference of the step bottom wall 34a, or may be only partially provided in the circumferential direction (for example, only at an upper edge thereof). In order to reduce generation of abnormal noise (striking sound), the front end in the projecting direction of the rib 37a is configured to be a free end that does not reach the lid 50 in a closed state. The rib 37a suppresses the water W having entered the recess 30 from the parting (gap) between the outer panel 21 and the lid 50 in a closed state from flowing into a space in the recess 30 where the hydrogen filling port 40 is provided.

The hydrogen filling port 40 is a part into which a filling gun 100 of a not-shown fuel supply device (hydrogen supply device) provided outside the vehicle body 20 is fitted (attached), and this part receives hydrogen supply. The hydrogen filling port 40 is fixedly attached to a wheelhouse outer 22 of the vehicle body 20 via a not-shown bracket. The hydrogen filling port 40 is disposed so as to protrude from the filling-port insertion hole 31a of the bottom wall 31 of the recess 30 into the recess 30. The hydrogen filling port 40 has a gun fitting portion 41 into which the filling gun 100 is fitted during hydrogen filling. The gun fitting portion 41 is positioned in the recess 30.

The lid 50 opens and closes the recess 30. The lid 50 includes: a lid inner 51; and a lid outer 52 that is fixed to the lid inner 51 and is located on the outer side in the vehicle width direction of the lid inner 51 when the lid 50 is in a closed state.

The lid inner 51 is made of resin and is a molded product. As shown in FIG. 5, the lid inner 51 has a hinge portion 51a at a front end or a rear end of the lid inner 51 in the longitudinal direction of the vehicle body. The hinge portion 51a is turnably supported by a turning shaft (not shown) provided to the box-like member 37. Thereby, the lid inner 51 (lid 50) is turnably supported by the box-like member 37 (recess 30).

The lid outer 52 is made of metal. The lid outer 52 may have a single-component configuration or a multi-component configuration. FIG. 3 shows a case in which the lid outer 52 has a two-component configuration including: an outer first member 52a; and an outer second member 52b. If the lid outer 52 has a two-component configuration, the outer surface in the vehicle width direction of the outer first member 52a is a design surface 52a1 when the lid 50 is in a closed state. If the lid outer 52 has a two-component configuration, the lid outer 52 is fixed to the lid inner 51 by the outer second member 52b.

The drainage portion 60 is provided at least above the hydrogen filling port 40 in the recess 30 with the lid 50 in a closed state. The drainage portion 60 is provided to mainly suppress the water W, which has entered the recess 30 from the gap (parting) G between the lid 50 in a closed state and the outer panel 21 of the vehicle body 20 and, has flowed over the rib 37a, from adhering to the hydrogen filling port 40. The drainage portion 60 may be provided only above the hydrogen filling port 40 or only above and on the lateral side or lateral sides of the hydrogen filling port 40 (first embodiment); or the drainage portion 60 may be provided at an outer position continuously around the whole outer circumference of the hydrogen filling port 40 (second embodiment).

The drainage portion 60 is provided to extend from one to the other of the bottom wall 31 of the recess 30 and the lid 50 when the lid 50 is in a closed state. The illustrated example shows a case in which the drainage portion 60 is provided to extend from the lid 50 toward the bottom wall 31 of the recess 30. Hereinafter, in the embodiments of the present disclosure, a case in which the drainage portion 60 is provided to extend from the lid 58 toward the bottom wall 31 of the recess 30 will be described unless otherwise specified.

The drainage portion 60 may be provided to extend from the lid 50 in the horizontal direction, or to be inclinedly extend from the lid 50 more downward than the horizontal direction, or to inclinedly extend from the lid 58 more upward than the horizontal direction. The front end in the extending direction of the drainage portion 60 does not reach the bottom wall 31 of the recess 30 and is configured to be a free end for the purpose of reducing occurrence of abnormal noise (hitting sound). The drainage portion 60 is made of, for example, resin, and is provided to the lid inner 51. The drainage portion 60 may be formed separately from the lid inner 51 and fixedly attached to the lid inner 51; however, it is desirable to integrally form the drainage portion 60 with the lid inner 51 in order to reduce the number of parts.

The drainage portion 60 covers the entire gun fitting portion 41 of the hydrogen filling port 40 at least from above when the lid 50 is in a closed state. When viewed from the base in the extending direction of the drainage portion 60 (when viewed from the lid 50 side), an upper surface 61 of the drainage portion 60 is inclined to either or both of the left and the right sides with respect to the hydrogen filling port 40 at a center position (see FIG. 5, FIG. 6). Therefore, the upper surface 61 of the drainage portion 60 has an inclined surface 62 that is inclined downward and in a direction away from the hydrogen filling port 40 when viewed from the base in the extending direction of the drainage portion 60. FIG. 6 shows a case in which the upper surface 61 of the drainage portion 60 has an inverted "V" shape that is convex upward in a sectional view (transverse sectional view) orthogonal to the extending direction of the drainage portion 60, and the upper surface 61 is inclined toward both the right and the left sides with respect to the hydrogen filling port 40 at the center position.

The inclined surface 62 may be a flat surface or a curved surface. It is desirable that an angle θa defined between the inclined surface 62 and a horizontal plane passing through the position of the upper surface 61 immediately above the hydrogen filling port 40 is set to be 3° or greater. This is because the water W present on the drainage portion 60 can be easily drained from the drainage portion 60 along the inclined surface 62, as indicated by arrows in FIG. 6.

As shown in FIG. 3, The drainage portion 60 may be provided, at its front-end in the extending direction, that is, at its end closer to the bottom wall 31 of the recess 30, with a flange 63 that is bent in a direction away from the hydrogen filling port 40 (e.g. upward) and extends at a predetermined amount. The flange 63 may be provided only to a part in the direction perpendicular to the extending direction and the thickness direction of the drainage portion 60, or may be provided continuously over the entire region in this direction.

Next, operation and effects common through the embodiments of the present disclosure will be described.

(A) In order to make the filling gun 100 accessible from obliquely above and to facilitate titling of the filling gun 100 into the hydrogen filling port 40, it is desirable to arrange the hydrogen filling port 40 to be inclined upward and outward in the vehicle width direction, as with a fuel filling port (not shown) in a general gasoline vehicle. However, setting the hydrogen filling port 40 to be inclined upward may cause a problem that water is likely to enter the inside of the hydrogen filling port 40, or the like, and an inclination angle θb of the hydrogen filling port 40 relative to the horizontal plane (see FIG. 3) is an angle which is smaller (e.g., 2° or smaller) than the inclination angle of a fuel filling port of a general gasoline vehicle. However, in the case in which the inclination angle θb of the hydrogen filling port 40 is small, since the outer panel 21 of the vehicle body 20 is generally inclined downward and outward in the vehicle width direction, it becomes difficult to ensure a gap D between the tilling gun 100 fitted into the hydrogen filling port 40 and the outer panel 21 of the vehicle body 20. For this reason, the hydrogen filling port 40 is positioned more outward in the vehicle width direction than a fueling port in a general gasoline vehicle, to thereby ensure the gap D between the filling gun 100 and the outer panel 21 of the vehicle, body 20. Consequently, the hydrogen filling port 40 is located closer to the outer panel 21 of the vehicle body 20, so that the water W having enter the recess from the gap (parting) C between the lid 50 in a closed state and the outer panel 21 of the vehicle body 20 can easily adhere to the hydrogen filling port 40.

To cope with this, in the embodiments of the present disclosure, when the lid 50 is in a closed state, the drainage portion 60 extending from one to the other of the bottom wall 31 of the recess 30 and the lid 50 is provided at least above the hydrogen filling port 40 in the recess 30. Therefore, the water W, which has entered the recess 30 from the gap (parting) G when the lid 50 is in a closed state, reaches the upper surface 61 of the drainage portion 60, flows along the upper surface 61 of the drainage portion 60, and then flows down from the drainage portion 60 while avoiding the hydrogen filling port 40. Accordingly, it is possible to suppress the water W which has entered the recess 30 while the lid 50 is in a closed state from adhering to the hydrogen filling port 40. Therefore, when the lid 50 in a closed state is opened and the tilling gun 100 of the fuel supply device is fitted into the hydrogen filling port 40 from the outside of the vehicle body to fill hydrogen, it is possible to prevent that the water adhering to the hydrogen filling port 40 becomes frozen by the low-temperature hydrogen gas being supplied and the filling gun 100 cannot be thus pulled out from the hydrogen filling port 40.

(B) Since the drainage portion 60 covers the entire gun fitting portion 41 at least from above, it is possible to efficiently suppress the water W which has entered the recess 30 from the gap (parting) C while the lid 50 is in a closed state from adhering to the gun fitting portion 41. Therefore, when the lid 50 in a closed state is opened and the filling gun 100 of the fuel supply device is fitted into the hydrogen filling port 40 from the outside of the vehicle body to fill hydrogen, it is possible to effectively suppress the water adhering, to the hydrogen filling port 40 from being frozen by the low-temperature hydrogen gas being filled, thus preventing the filling gun from not being pulled out.

(C) As shown in FIG. 5, FIG. 6, since the upper surface 61 of the drainage portion 60 is inclined to either or both of the right and the left sides with respect to the hydrogen filling port 40 at the center position, the water W, which has entered the recess 30 from the gap (parting) G and has reached the upper surface 61 of the drainage portion 60, can be brought to flow along the inclined surface 62. Therefore, it is possible to allow the water to efficiently flow down from the drainage portion 60 while avoiding the hydrogen filling port 40.

(D) Since the upper surface 61 of the drainage portion 60 has an inverted V shape that is convex upward in a sectional view orthogonal to the extending direction of the drainage portion 60, the water W, which has entered the recess 30 from the gap (parting) G and has reached the upper surface 61 of the drainage portion 60, can be brought to flow along the upper surface 61 having an inverted V-shape of the drainage portion 60 to both sides of the drainage portion 60.

Accordingly, it is possible to allow the water to efficiently flow down from the drainage portion 60 while avoiding the hydrogen filling port 40.

(E) Since the drainage portion 60 has the flange 63 that is bent and extends in the direction away from the hydrogen filling port 40 at the front end in the extending direction of the drainage portion 60, it is possible to prevent the water flowing along the upper surface 61 of the drainage portion 60 from flowing down from the front end in the extending direction of the drainage portion 60 toward the hydrogen filling port 40.

(F) Since the drainage portion 60 is provided to the lid 50, the drainage portion 60 can be moved together with the lid 50 when the lid 50 is opened. Therefore, it is possible to suppress the drainage portion 60 from staying near the hydrogen filling port 40 when the lid 50 is in the open state. Accordingly, when the lid 50 is opened and the filling gun 100 of the fuel supply device is fitted into the hydrogen filling port 40 from the outside of the vehicle body to fill hydrogen, it is possible to suppress the drainage portion 60 from interfering with the filling gun 100 and hindering the hydrogen filling work.

(G) Since the drainage portion 60 is made of resin and formed integrally with the lid inner 51, compared to the case in which the drainage portion 60 is formed separately from the lid inner 51 and is fixedly attached to the lid inner 51, the number of parts and assembly man-hours can be reduced, thus reducing the cost.

Parts unique to the embodiments of the present disclosure will be described, as follows.

First Embodiment (FIG. 1 to FIG. 6)

In the first embodiment of the present disclosure, the drainage portion 60 is provided only above the hydrogen filling port 40 or only above and on the lateral side or the lateral sides of the hydrogen filling port 40. That is, the drainage portion 60 is not provided below the hydrogen filling port 40. The drainage portion 60 is provided to extend from the lid inner 51 in the horizontal direction. The flange 63 is provided at the front end in the extending direction of the drainage portion 60.

In the first embodiment of the present disclosure, in addition to the operation and effects (A) to (G) common through all the embodiments f the present disclosure, the following operation and effects can be obtained.

(H1) Since the drainage portion 60 is provided only above the hydrogen filling port 40 or only above and on the lateral side or the lateral sides of the hydrogen filling port 40, compared to the case in which the drainage portion 60 is provided at an outer position continuously around the whole outer circumference of the hydrogen filling port 40, it is possible to attain weight reduction, which is advantageous in cost.

(H2) Since the drainage portion 60 is provided only above the hydrogen filling port 40 or only above and on the lateral side or the lateral sides of the hydrogen filling port 40, it is possible to relatively easily avoid interference of the drainage portion 60 with the hydrogen filling port 40 and the recess 30.

Figure 1:
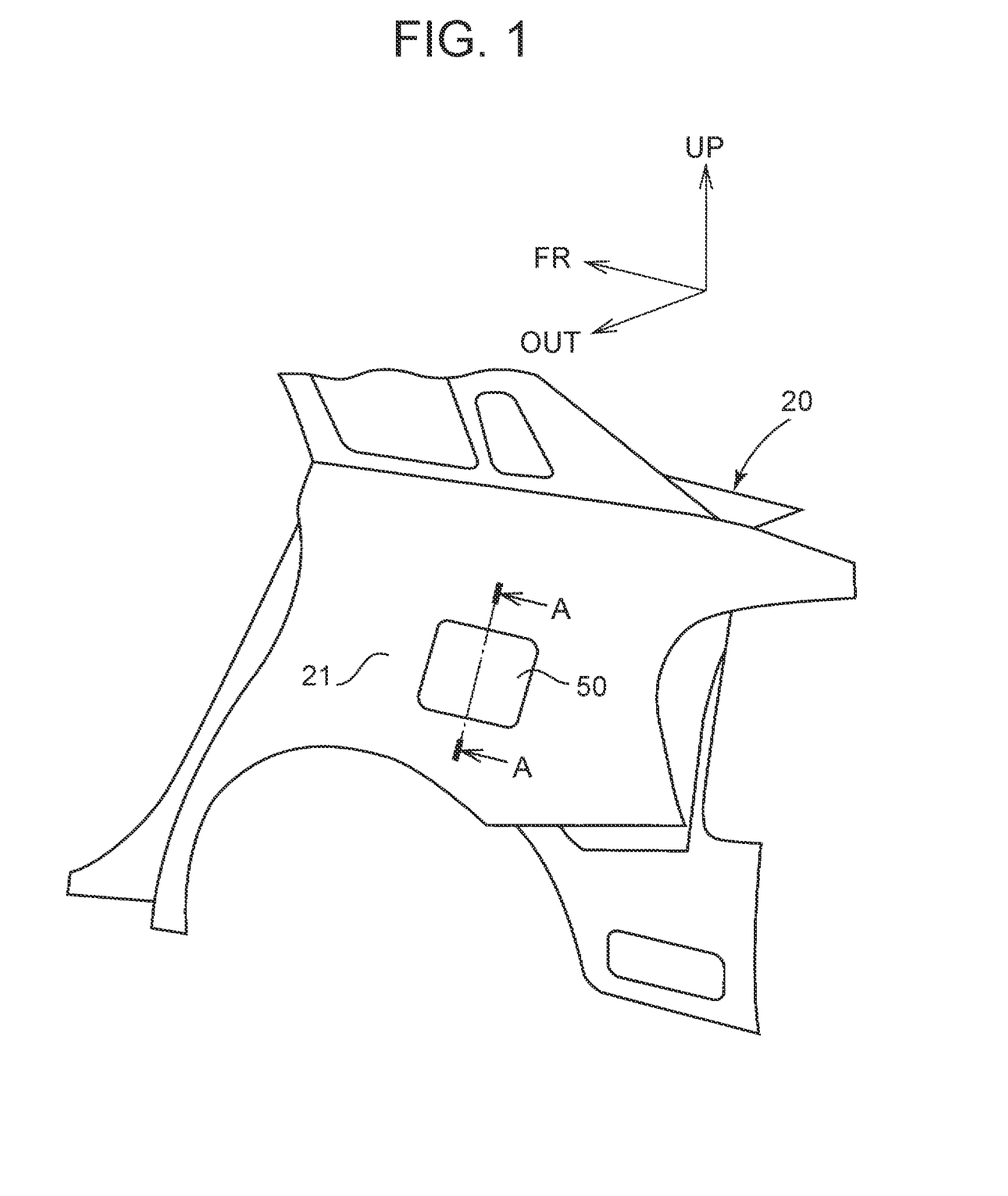
FIG. 1 is a partial side view of a vehicle body having a hydrogen filling structure of a first embodiment of the present disclosure.
Figure 2:
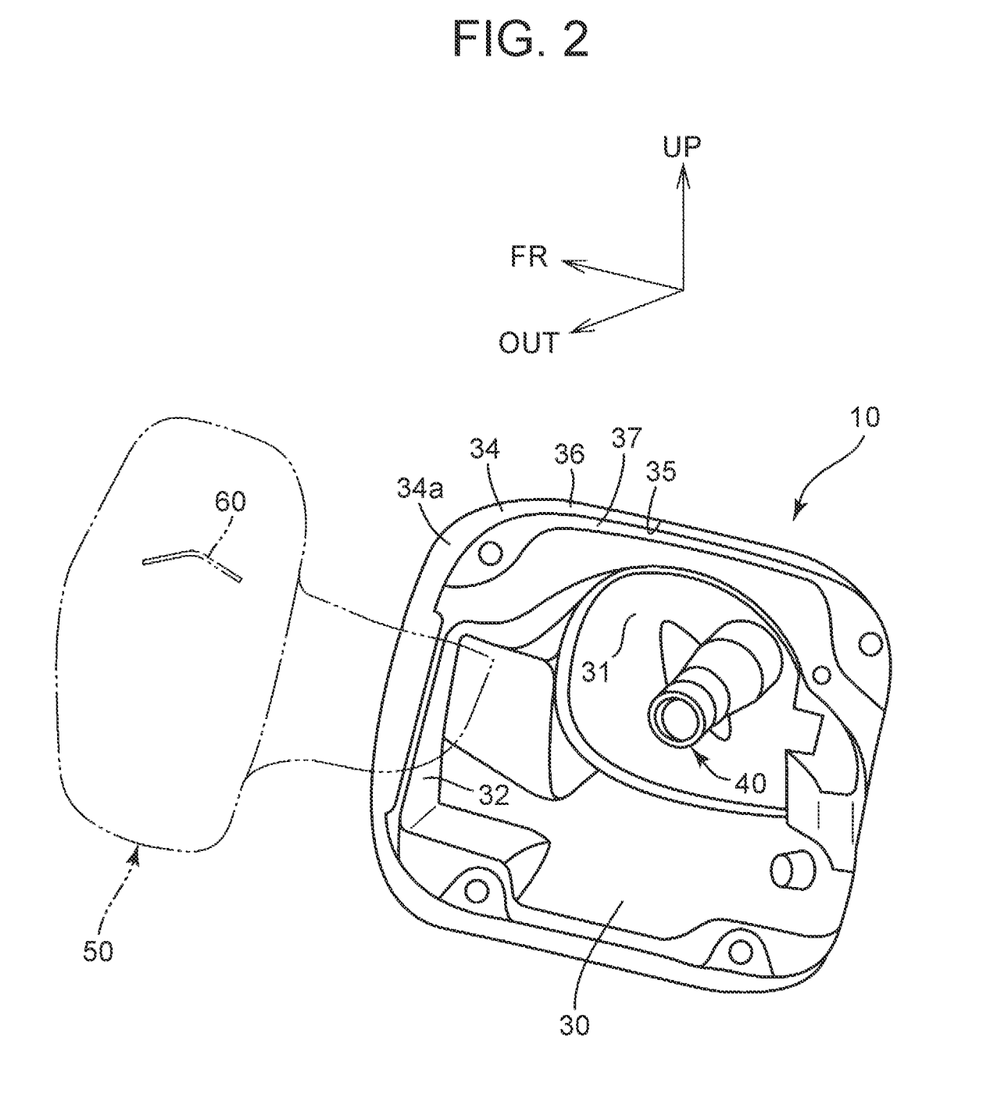
FIG. 2 is a perspective view of the hydrogen filling structure of the first embodiment of the present disclosure, while a lid is in an open state.

Second Embodiment (FIG. 1, FIG. 8)

In the second embodiment of the present disclosure, the drainage portion 60 is provided at an outer position continuously and concentrically around the whole outer circumference of the hydrogen filling port 40, for example. The drainage portion 60 is provided to extend from the lid, inner 51 and be inclined more downward than the horizontal direction, for example, in parallel with the hydrogen filling port 40. The flange 63 is provided at the front end in the extending direction of the drainage portion 60.

In the second embodiment of the present disclosure, in addition to the operation and effects (A) to (G) common through all the embodiments of the present disclosure, the following operation and effects can further be obtained.

(I) Since the drainage portion 60 is provided at an outer position continuously around the whole outer circumference of the hydrogen filling port 40, it is possible to reliably suppress the water flowing along the upper surface 61 of the drainage portion 60 from adhering to the hydrogen filling port 40.

What is claimed is:

1. A hydrogen tilling structure comprising:
a recess provided to an outer panel of a vehicle body;
a hydrogen filling port disposed to protrude from a bottom wall of the recess into the recess; and
a lid configured to open and close the recess, wherein
in a state in which the lid is closed, a drainage portion is provided at least above the hydrogen tilling port in the recess in such a manner as to extend from one to the other of the bottom wall of the recess and the lid.

2. The hydrogen filling structure according to claim 1, wherein:
the hydrogen filling port has a gun fitting portion into which a filling gun is fitted; and
the drainage portion covers the gun fitting portion at least from above.

3. The hydrogen filling structure according to claim 1, wherein as viewed from a base side in an extending direction of the drainage portion, an upper surface of the drainage portion is inclined to either or both of right and left sides with respect to the hydrogen filling port at a center position.

4. The hydrogen filling structure according to claim 1, wherein an upper surface of the drainage portion is formed in an inverted V shape that is convex upward in a sectional view orthogonal to the extending direction of the drainage portion.

5. The hydrogen filling structure according to claim 1, wherein the drainage portion is provided, at a front end thereof in the extending direction, with a flange that is bent and extends in a direction away from the hydrogen filling port.

6. The hydrogen filling structure according to claim 1, wherein the drainage portion is provided to extend from the lid in a closed state toward the bottom wall of the recess.

7. The hydrogen filling structure according to claim 6, wherein:
the lid includes a lid inner made of resin, and a lid outer fixed to the lid inner; and
the drainage portion is made of resin and integrally formed with the lid inner.

8. The hydrogen filling structure according to claim 1, wherein the drainage portion is provided only above the hydrogen filling port or only above and on a lateral side of the hydrogen filling port.

9. The hydrogen filling structure according to claim 1, wherein the drainage portion is provided at an outer position continuously around a whole outer circumference of the hydrogen filling port.

* * * * *